United States Patent [19]

Huang et al.

[11] Patent Number: 4,911,736

[45] Date of Patent: Mar. 27, 1990

[54] EMULSIFIER AND STABILIZER FOR WATER BASE EMULSIONS AND DISPERSIONS OF HYDROCARBONACEOUS MATERIALS

[75] Inventors: Chor Huang, Avon Lake; Lawrence E. Ball, Akron, both of Ohio

[73] Assignee: The Standard Oil Company, Cleveland, Ohio

[21] Appl. No.: 325,412

[22] Filed: Mar. 17, 1989

Related U.S. Application Data

[63] Continuation-in-part of Ser. No. 777,120, Sep. 18, 1985, abandoned.

[51] Int. Cl.$^4$ .............................................. C10L 1/32
[52] U.S. Cl. ................................... 44/51; 44/62; 526/238.23; 526/270; 526/271
[58] Field of Search ..................... 44/51, 62; 252/312, 252/314, 356; 526/238.23, 270, 271

[56] References Cited

U.S. PATENT DOCUMENTS

| | | | |
|---|---|---|---|
| 2,356,254 | 8/1944 | Lehmann, Jr. et al. | 252/8.55 |
| 3,255,108 | 6/1966 | Wiese | 252/32.7 |
| 3,715,312 | 2/1973 | Teeter et al. | 252/49.3 |
| 3,915,921 | 10/1975 | Schlatzer, Jr. | 260/17.45 G |
| 3,923,671 | 12/1975 | Knepp | 252/49.5 |
| 3,939,088 | 2/1976 | Goldschmidt et al. | 252/79 HF |
| 4,059,458 | 11/1977 | Germino et al. | 106/213 |
| 4,097,403 | 6/1978 | Tsutsumi et al. | 252/312 |
| 4,130,400 | 12/1978 | Meyer | 44/51 |
| 4,392,865 | 7/1983 | Grosse et al. | 44/51 |
| 4,429,097 | 1/1984 | Chang et al. | 526/317 |
| 4,437,861 | 3/1984 | Ishizuka et al. | 44/51 |
| 4,442,272 | 4/1984 | Brooks et al. | 44/62 |
| 4,454,113 | 6/1984 | Hemker | 424/63 |
| 4,509,949 | 4/1985 | Huang et al. | 586/558 |
| 4,509,954 | 4/1985 | Ishizaki et al. | 44/62 |
| 4,547,202 | 10/1985 | Miller | 44/62 |

FOREIGN PATENT DOCUMENTS

0137999 7/1985 Japan ........................................ 44/51

*Primary Examiner*—Jacqueline V. Howard
*Assistant Examiner*—Margaret B. Medley
*Attorney, Agent, or Firm*—D. P. Yusko; D. J. Untener; L. W. Evans

[57] ABSTRACT

Oil-in-water emulsions are stabilized against separation of the components by the addition of a novel interpolymer comprising (1) about 97 to about 99 percent by weight of a water soluble polymerizable monomer containing at least one acid group or salt thereof, and (2) about 1 to about 3 percent by weight of an ester of acrylic acid.

15 Claims, No Drawings

EMULSIFIER AND STABILIZER FOR WATER BASE EMULSIONS AND DISPERSIONS OF HYDROCARBONACEOUS MATERIALS

REFERENCES TO RELATED APPLICATIONS

This is a continuation-in-part of U.S. application Ser. No. 777,120 filed Sept. 18, 1985, now abandoned.

BACKGROUND OF THE INVENTION

1. Field of the Invention

The present invention is directed to the use of long chain alkyl ester copolymers as emulsifiers and stabilizers for water base emulsions and dispersions of hydrocarbonaceous materials. In particular, the present invention is directed to the use of copolymers of unsaturated carboxylic acid and long chain alkyl ester in the formation of such stable emulsions and dispersions. The emulsifier stabilizers of the present invention have specific utility in cleaning oil contaminated vessels, oil spill management, enhanced oil recovery by chemical flooding and the transportation and storage of heavy crude oil-water mixtures and coal-water slurries.

2. Description of the Prior Art

The use of surfactants or emulsifiers to produce stable emulsions or dispersions of various hydrocarbonaceous materials in water have been attempted in the prior art.

For example, ordinary surfactants or emulsifiers have been used to produce oil-in-water emulsions. Ordinary surfactants, generally, are compounds which have a low molecular weight (e.g. less than 30 carbon atoms) and contain hydrophilic (water loving) and lipophilic (oil-loving) groups. When a mixture of oil and water is mechanically sheared in the presence of these types of surfactants, the surfactants distribute themselves at the oil-water interface as the droplets of oil are formed thus facilitating the formation of an oil-in-water emulsion. Because of the faster mobility of the low molecular weight surfactants, they are quite effective in forming an initial emulsion of the oil and water. However, when the mechanical shear is removed and the emulsion is allowed to stand for some time (i.e. a few hours, days) most emulsions made from this type of surfactant tend to separate. The reason attributed to the separation is because the mobility of the surfactants are such that they move in and out of the surface of the oil droplets leaving some surface area of the oil droplets exposed. Accordingly, when two oil droplets collide at an exposed site, coalescence of the droplets occurs. As time goes on, larger and larger droplets of oil are formed resulting in the separation of the oil phase from the water phase. This same principle also is applicable to coal-in-water dispersions. Coal particles suspended in such a mixture will collide and agglomerate over time. As the agglomerates become larger, they become too heavy to remain suspended in the mixture and settle to the bottom of the mixture. Accordingly, to stabilize the emulsions and dispersions of hydrocarbonaceous materials in water the use of a surfactant which is not mobile would be highly desirable.

In U.S. Pat. No. 4,311,832 to Gutnick et al., a naturally occurring long chained material suitable for emulsions stabilization of oil-in-water emulsions is disclosed. The material is identified as "EMULSAN". The emulsion stabilizer properties of "EMULSAN" arise from its unique structure which consists of a large molecular weight molecule containing both hydrophilic and lipophilic groups. The large molecular weight of the emulsan molecule is such that once the molecules have attached themselves to the oil water interface they tend to stay there resulting in a highly stable emulsion. While emulsions produced by the use of "EMULSAN" have exhibited high stability they are produced by biotechnological procedures which are relatively inflexible because of their dependence on bacteria to make the product. Accordingly, the use of a synthetic high molecular weight material as a emulsion stabilizer would be highly preferable because it may be modified or produced by various procedures giving the molecule a significant flexibility not possessed by the biotechnological product.

U.S. Pat. No. 3,915,921 to Schlatzer discloses unsaturated carboxylic acid-long chain alkyl ester copolymers and terpolymers useful as water thickening agents and emulsifiers. The patent is directed to the formation of a thickener which is not ion sensitive and serves to efficiently maintain or increase the viscosity of water or organic solvent solutions containing inorganic salts such as sodium chloride. In part, the disclosure of this patent is directed to copolymers of between 50 and 95 percent by weight of an unsaturated carboxylic acid and between 5 and 50 percent by weight of a long chain alkyl esters. These copolymers are disclosed to be emulsifying agents for water-solvent compositions.

It is the primary object of the present invention to provide a polymer possessing emulsifying and stabilizing properties for use in production of stable emulsions and dispersions of hydrocarbonaceous materials in water. It is a further object of the present invention to provide a novel stable oil-in-water emulsion and coal-in-water dispersions.

SUMMARY OF THE INVENTION

An interpolymer, having emulsifying and stabilizing properties, is produced by polymerizing a monomer mixture consisting essentially of (1) about 97 to about 99 percent by weight of at least one water soluble polymerizible monomer containing at least one acid group or salts thereof, and (2) about 1 to about 3 percent by weight of at least one acrylic acid derivative of the formula:

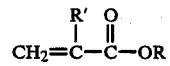

where R is a member of a class consisting of alkyl groups having from 10 to 30 carbon atoms and R' is selected from the group consisting of hydrogen and methyl.

These polymers are employed to emulsify and stabilize mixtures of hydrocarbonaceous materials comprising up to about 80 wt. percent hydrocarbonaceous material and about 0.1 to about 5 wt. percent polymer with the remainder being water. These polymers work best in aqueous media containing about 1 to about 20 wt. percent salt.

DETAILED DESCRIPTION OF THE INVENTION

In part, the present invention describes and claims an interpolymer. As used herein an interpolymer is simply the polymerization product of the monomers described and includes any and all straight chain polymers, graft polymers, block polymers and crosslinked polymers produced by such polymerization.

The Polymer:

An interpolymer, having emulsifying and stabilizing properties, is produced by polymerizing a monomer mixture comprising (1) about 97 to about 99 percent by weight of at least one polymerizible monomer containing at least one acid group or salts thereof, and (2) about 1 to about 3 percent by weight of at least one acrylic acid derivative of the formula:

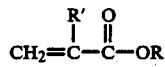

where R is a member of a class consisting of alkyl groups having from 10 to 30 carbon atoms and R' is selected from the group consisting of hydrogen and methyl.

As used in this description, water soluble polymerizable monomers containing at least one acid group, or the salt of these monomers shall include (1) a broad class of olefinically unsaturated carboxylic monomers as described in the subsequent paragraph and (2) sulfur or phosphorus containing organic acids such as 2-acrylamido-2-methylpropanesulfonic acid (AMPS) and derivatives thereof, vinyl phenyl sulfonic acid and vinyl phosphoric acid and the like The olefinic unsaturated carboxylic monomers used in the production of the polymers of the present invention are the olefinically unsaturated carboxylic acids containing at least one activated carbon-to-carbon olefinic double bond, and at least one carboxyl group, that is an acid containing an olefinic double bond which readily functions in polymerization because of its presence in the monomer molecule either in the alpha-beta position with respect to a carboxyl group as set forth below:

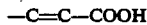

or as a part of a terminal methylene grouping, for example $CH_2=C<$. The close proximity of the strongly polar carboxyl group to the double-bonded carbon atoms in the alpha-beta acids has a strong activating influence rendering the substances containing this structure readily polymerizable. Similarly, the presence of the terminal methylene grouping in a carboxylic monomer makes this type of compound much more easily polymerizable than if the double bond were intermediate in the carbon structure. Olefinically-unsaturated acids of this broad class includes such widely divergent materials as the acrylic acids such as acrylic acid itself, methacrylic acid, ethacrylic acid, alpha-choro acrylic acid, alpha-cyano acrylic acid, and others, crotonic acid, beta-acryloxy propionic acid, hydrosorbic acid, sorbic acid, alpha-choro sorbic acid, cinnamic acid, beta-styryl acrylic acid (1-carboxy-4-phenylbutadiene-1,3), hydromuconic acid, itaconic acid, citraconic acid, mesaconic acid, muconic acid, glutaconic acid, aconitic acid and others. For purposes of this application, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Anhydrides of the types formed by elimination of water from two or more molecules of the same or different unsaturated acids, such as acrylic anhydride, are not included because of the strong tendency of their polymers to hydrolyze in water and alkali.

Normally, it is preferred that one utilize one or more alpha-beta unsaturated carboxylic acids containing at least one carboxyl group as the water soluble polymerizable monomer, with the olefinic double bond alpha-beta to at least one carboxyl group. For example alpha-beta unsaturated carboxylic acids of this type include the acrylic acids disclosed above and in addition beta-methyl acrylic acid (crotonic acid), alpha-phenyl acrylic acid, and others, hydrosorbic acid, alpha-butyl crotonic acid, angelic acid, cinnamic acid, m-chloro cinnamic acid, p-chloro cinnamic acid, umbellic acid, and other monoolefinic monocarboxylic acids; maleic acid, fumaric acid, hydromuconic acid, glutaconic acid, itaconic acid, citraconic acid, mesconic acid tricarboxy ethylene, tetracarboxy ethylene, and other monoolefinic di- and polycarboxylic acids; sorbic acid, betaacryloxy acrylic acid, beta styryl acrylic acid (4-phenyl 1-carboxy butadiene-1,3) and other polyolefinic monocarboxylic acids; 3-carboxy-pentadiene-2,4)-oic-1, muconic acid and other polyolefinic polycarboxylic acid; and maleic anhydride and other acid anhydrides having the structural formula:

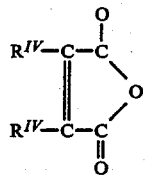

wherein each $R^{IV}$ is independently selected from the group consisting of hydrogen, halogen, cyanogen ($-C\equiv N$), hydroxyl, lactam and lactone groups and alkyl, aryl, alkaryl, aralkyl, and cycloalkyl groups such as methyl, ethyl, propyl which can also be termed lower alkyl groups, octyl, decyl, phenyl, tolyl, xyly, benzyl, cyclohexyl and the like; and others.

Preferably, carboxylic monomers for use in preparing the polymer material used in the formation of the stable oil-in-water emulsion of the present invention are the monoolefinic acrylic acids having the general structure

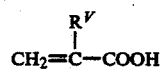

wherein $R^V$ is a substituent selected from the class consisting of hydrogen, halogen, hydroxyl, lactone, lactam and the cyanogen ($-C\equiv N$) groups, monovalent alkyl radicals, monovalent aryl radicals, monovalent aralkyl radicals, monovalent alkaryl radicals and monovalent cycloaliphatic radicals. Acrylic acid, methacrylic acid, ethacrylic acid, chloro-acrylic acid, bromoacrylic acid, cyano-acrylic acid, alpha-phenyl acrylic acid, alpha-benzyl acrylic acid, alpha-cyclohexyl acrylic acid, and others are illustrative of the preferred materials. Alpha-halo acrylic acids readily hydrolyze at the halogen substitution with the formation of hydroxyl and lactone groups. Acrylic acid is most preferred because of its superior polymers. A preferred carboxylic monomer is maleic anhydride.

The preferred acrylic ester monomers having long chain aliphatic groups are derivatives of acrylic acid represented by the formula:

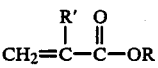

wherein R is a member of the class consisting of alkyl groups having from 10 to 30 carbon atoms, preferably 12 to 22 carbon atoms and R' is hydrogen or a methyl group. Representative higher alkyl acrylic esters are decyl acrylate, lauryl acrylate, octadecyl acrylate (stearyl acrylate), behenyl acrylate and melissyl acrylate and the corresponding methacrylates. Mixtures of two or three or more long chain acrylic esters may be successfully polymerized with one of the carboxylic monomers to provide suitable polymers useful in producing the stable oil-in-water emulsion of the present invention.

Preferably, the polymers of the present invention are made by polymerization in an inert diluent having some solubilizing action on one or more of the monomeric ingredients but substantially none on the resultant polymer. Polymerization in mass may be employed but is not preferred because of the difficulty in working up the solid polymeric masses obtained. Polymerization in an aqueous medium containing a water-soluble free radical catalyst, such as a peroxygen compound, is useful, the product being obtained either as a granular precipitate or as a highly swollen gel, either of which may be used directly or are easily further subdivided and dried. Most preferably, polymerization is performed in an organic liquid which is solvent for the monomers but a non-solvent for the polymer, or in a mixture of such solvents, in the presence of a solvent-soluble catalyst because the product is usually obtained as a very fine friable and often fluffy precipitate which, after solvent removal, seldom required grinding or other further treatment before use. Solvents for the latter method include benzene, xylene, tetralin, hexane, petane, carbon tetrachloride, methyl chloride, ethyl chloride, bromo trichloro methan, dimethyl carbonate, diethyl carbonate, ethylene dichloride, and mixtures of these and other solvents.

Polymerization in the diluent medium is carried out in the presence of a free radical catalyst in a closed vessel in an inert atmosphere and other autogenous pressure or artificially-induced pressure or in an open vessel under reflux at atmospheric pressure. Temperature of the polymerization may be varied from 0° C. to 100° C., depending to a large degree on the molecular weight desired in the polymer. Polymerization under reflux at 50° to 90° C. under atmospheric pressure using a free radical catalyst is generally effective in bringing a polymer yield of 75 percent to 100 percent in less than 10 hours. Suitable catalysts include peroxygen compounds such as sodium, potassium and ammonium persulfates, carpylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalysts utilizable are the so-called "redox" type of catalyst and the heavy-metal activated catalyst systems. These polymers generally do not attain their maximum properties in water until converted to a partial alkali, ammonium or amine salt. The neutralizing agent is preferably a monovalent alkali, ammonium ar amine salt. The neutralizing agent is preferably a monovalent alkali such as sodium, potassium lithium or ammonium hydroxide or the carbonates and bicarbonates thereof, or mixtures of the same, and also amine bases having not more than one primary or secondary amino group. Polyvalent bases such as calcium hydroxide usually have a deswelling action on the water-swollen polymers and their salts, although their absolute swell notwithstanding the presence of the polyvalent metal ions, is higher than that of the naturally-occurring gum-like materials such as gum tragacanth and the like in the presence of the same deswelling agents.

Emulsions and Dispersions of Hydrocarbonaceous Materials in Water

The polymers of the instant invention are used as emulsifiers and stabilizers for mixtures of hydrocarbonaceous materials and water specifically, emulsions and dispersions of hydrocarbonaceous materials in water. An "emulsion" is a stable mixture of two or more immiscible liquids held in suspension by a small percentage of substances called emulsifiers. In contrast, a "dispersion" is a two-phase system of which one phase consists of finely divided particles distributed through a bulk substance. For purposes of this invention the term "hydrocarbonaceous material" is understood to mean naturally occurring or synthetic liquid and solid hydrocarbons such as heavy or crude oil, heavy hydrocarbon sludge such as organic residue found in toxic waste-sites and coal.

The polymers of the instant will effectively emulsify and stabilize a mixture of liquid hydrocarbonaceous materials and water. These polymers are very effective when the water or an aqueous medium used for the emulsion comprises about 1 to 20 wt. percent of a salt. As used herein "salt" is the compound formed when the hydrogen of an acid is replaced by a metal or its equivalent (e.g. an NN₄ radical). Metallic salts of chlorides, sulfates, carbonates and nitrates are routinely found in nature, for example ocean water (2.6 wt. percent NaCl) and oil well brine (3 to 20 wt % NaCl). The polymers of the instant invention are e specially effective in emulsion comprising ocean water and oil well brine.

The polymers of the instant invention will effectively emulsify and stabilize a mixture of liquid hydrocarbonaceous materials and water. Such liquid hydrocarbonaceous materials, referred to hereinafter simply as oil, include within its scope, heavy or crude oil and viscous refining products. In order to better clarify the terms "heavy crude" and "viscous refinery products", initially, it should be understood that there is no universally accepted, clearcut definition for heavy crudes. In the context of the present invention, "heavy" and "viscous" will be considered synonymous. While low API gravity, i.e., high density, does not necessarily coincide with high viscosity, these characteristics are almost always correlated. Similar statements apply to what is referred to as "viscous refinery products," which for purposes of the present invention should be taken to include any viscous, usually high-density, liquid or semi-solid material remaining following the refining process. Vacuum resid and asphalt are primary examples of such materials. The following characteristics usually are considered typical of these hydrocarbons:

1. Low API gravity, generally at or below 20°. This is the most frequently used criterion, both because it is easily measured and because 20° crude roughly corresponds to the lower limit recoverable with conventional production techniques.

2. Viscosities in the range of $10^2$ to $10^6$ centipoises (cp) or even higher in some cases.
3. High metal contents. For example, heavy crudes often have nickel and vanadium contents as high as 500 ppm. Resids can sometimes be even higher in metals.
4. High sulfur content, e.g., 3 weight percent or more, especially for vacuum bottoms.
5. High asphaltene content.

Similarly, the polymers of the instant invention also effectively stabilize dispersions of hydrocarbonaceous solids and water, against the settling of the solid. Solid hydrocarbonaceous materials, referred to hereinafter simply as coal include anthracite, bituminous, subbituminous and lignite coals, as well as oil shale and peat.

Oil-in-water Emulsions

The stable oil-in-water emulsions of the present invention are produced by a method comprising mixing a polymeric material having emulsifying and emulsion stabilizing properties, oil and water and stirring the mixture to form the stable emulsion. Due to the extreme stability of the oil-in-water emulsions of the present invention, they are useful in oil spill management, pipeline transportation of heavy crude, and cleaning of oil contaminated vessels. The polymeric material used in the present invention is characterized as both an emulsifier and emulsion stabilizer because it not only has the ability to emulsify the oil and water but to stabilize the oil and water once the emulsion has been formed.

The length of time required to mix the component to form the resulting stable emulsion of the present invention is not critical. However, mixing should be performed for a time sufficient to insure uniform dispersion of the polymeric emulsifier and emulsion stabilizer throughout the solution (e.g. 20 minutes).

Most preferably, the oil-in-water emulsion of the present invention contains a conventional low molecular weight surfactant to facilitate the formation of the emulsion. The use of a low molecular weight surfactant reduces substantially the time required to form the emulsion because the conventional surfactant is highly mobile. Therefore, during mixing of the components, the conventional surfactant distributes itself rapidly at the oil-in-water interface as the droplets of oil are formed. The polymeric material then distributes itself about the oil droplets to stabilize the already formed oil-in-water emulsion. Any conventional low molecular weight surfactant compatible with the polymeric material may be utilized in the practice of this embodiment of the present invention. For example, the petroleum or alkylaryl sulphonate surfactants such as those described in *Recent Advances in Surfactant Flooding*, Mattax C. C., Proceeding World Petroleum Congress, 1983, 11 (3) Pg. 205 (1984), herein incorporated by reference, may be utilized in the practice of the present invention.

Generally, the oil-in-water emulsions of the present invention comprises up to 80 wt. percent oil, 0.01 to 5 wt. percent polymer, with the remainder being water. Preferably, the oil-in-water emulsion comprises up to 70 wt. percent oil, 0.1 to 2 wt. percent polymer, With the remainder being water.

Applications for the Polymeric Emulsifiers and Stabilizers

In general the polymeric emulsifier and stabilizers of the instant invention are used to produce stable emulsions or dispersions of the various hydrocarbonaceous materials in water described herein. Representatives of potential applications for the polymers described herein include but are not limited to:
Cleaning oil-contaminated vessels;
Oil-spill management;
Heavy crude oil transportation;
Bitumen and asphalt emulsions;
Conversion of heavy oils to pumpable fuels;
Hazardous waste disposal (converting hydrocarbonaceous sludges to pumpable emulsions for liquid injection into furnaces);
Petroleum drilling fluids;
Enhanced oil recovery by chemical flooding;
Oil-in-water lubricants;
Industrial and consumer cleaning/polishing products;
Metal degreasing;
Agrichemical/fertilizer dispersions and emulsions;
Cosmetics, pharmaceutical, flavor/fragrance and food emulsions;
Dispersion stabilization;
Coal-in-water slurries;
Pigments/fillers stabilization;
Latex stabilization;
Paints and industrial coatings;
Rheology control agents; and
Textile and pulp/paper processing.

It has been noted that an advantage of using the polymeric emulsifiers and stabilizers of the instant invention over similar compositions known in the art is the ease of dispersion of the hydrocarbonaceous material in the aqueous system. Specifically, the hydrocarbonaceous materials disperse easier, quicker and with less agitation using the emulsifiers of the present invention.

SPECIFIC EMBODIMENTS

Example I

Preparation of the Polymer

Acrylic acid copolymers were prepared using precipitation polymerization techniques. The continuous phase for the acrylic acid copolymers was benzene.

Acrylic acid copolymers were prepared in the following manner. Benzene, benzoyl peroxide and hexadecyl methacrylate (HM) were weighed into eight ounce bottles. Acrylic acid was then weighed in, and the bottles were agitated to mix and dissolve all chemicals. These bottles were also purged with an inert gas, capped, and run in a 75c bottle bath for 16 hours. The products were filtered, washed with benzene, and dried in vacuo at 40° C. for 24 hours. Table I exhibits the specific amounts of each chemical used.

TABLE I

| Preparation of Acrylic Acid Copolymers | | | | | | |
|---|---|---|---|---|---|---|
| Sample Designation | Grams Benzene | Grams Benzoyl Peroxide | Grams HM | Grams of AA | Wt Percent of HM in Polymer | Percent Yield |
| A | 119.02 | 0.06 | 0.60 | 11.52 | 4.95% | 97.4% |
| B | 119.03 | 0.068 | 0.60 | 11.48 | 4.97% | 96.9% |

Example II

Preparation of Oil-in-Water Emulsion

An oil-in-water emulsion was prepared for each of the polymers produced in Example I. Specifically, 16.8 of a 1% solution of each acrylic/hexadecyl methacrylate copolymer were combined in a 250 ml beaker with 11.8 g distilled water, 8.4 g of 10% solution of surfactant (Triton x 301), 12.0 g of crude oil and 3 drops of antifoam agent (Eldefoam 2892.) The mixture was stirred for 30 seconds at high speed, followed by additional stirring for 14 minutes and 30 seconds at medium speed.

Example III

Emulsion Testing

Each of the emulsions prepared in Example 2 were subject to the following tests and evaluations:

A. Viscosity of the emulsion. If it is exceedingly viscous, test for inversion (if it is water-in-oil).

B. Amount of oil floating on top.

C. Cleanliness of beaker when rinsed with water (in contrast to beaker appearance where no AA/MA emulsifier is used).

D. Whether or not the stirrer blade rinses clean with water.

E. The length of time which elapsed before the system separated into two layers is shown in the table below.

| Experiment No. | Copolymer (WT % Each Monomer) | Beaker Appearance | Initial Separation Time | Reshake Separation Time |
|---|---|---|---|---|
| III-A | 95.95/4.95 Acrylic Acid/Hexadecyl Methacrylate | better | 120 hrs | — |
| III-B | 95.93/4.07 Acrylic Acid/Hexadecyl Methacrylate | better | >1 and <24 hrs | 48 hrs |

Example IV

Emulsions without Surfactants

Emulsions were prepared as described in Example 2 for each of the acrylic acid/hexadecyl methacrylate copolymers prepared in Example 1 except that the surfactant was eliminated and the water content of the emulsion was increased to compensate for the water content eliminated with the surfactant. An oil-in-water emulsion was formed which separated in 6 min. The beaker was moderately clean, with an oil ring at the liquid to air interface.

Comparative Example V

Oil and Water Mixtures Using No Emulsifiers and No Surfactants

Mixtures were prepared as described in Example II for each of the acrylic acid/hexadecyl methacrylate copolymers prepared in Example I except that the surfactant and the emulsifier were eliminated and the water content of the emulsion was increased to compensate for the water eliminated with the emulsifier and surfactant. A water-in-oil emulsion resulted, as indicated by a mixture with high viscosity and an inability to dissolve the mixture in water. The mixture heavily coated the beaker and was difficult to rinse away.

Example VI

Relative Stability of Various Benzene/Polymer Slurries

Copolymers of acrylic acid/stearyl methacrylate and acrylic acid/hexadecyl methacrylate and emulsions thereof were prepared as in Examples I and III. Specifically, the aqueous phase of several benzene/polymer slurries was prepared as follows. Eight-ounce round bottles were charged with twice the amount that will be needed to run one emulsion stability test. The actual gram amount of each aqueous phase component is Triton X301 (20%)-8.4 grams, distilled water -66.50 grams, 9.2% benzene polymer slurry-3.66 grams. This was mixed at 60C. overnight to effect solubilization of the polymer. Half of the bottle contents (39.28 grams) was used for each stability test and to which 10.34 grams of oil was added and mixed for 15 minutes. The ratio of primary to secondary surfactant for this run was 5/1, or 0.84 grams of anionic Triton X301 to 0.168 grams of secondary polymeric stabilizer.

A control bottle was run without the addition of any polymer and had the following recipe; 4.2 grams of 20% anionic Triton X301, 33.25 grams of distilled water, and 1.83 grams of benzene (total aqueous phase amount; 39 28 grams), mixed with 10.34 grams of oil for fifteen minutes. This control had only primary surfactant and no secondary polymeric stabilizer. It showed very poor stability and the washability of the beaker was also very bad as it was heavily coated with oil.

TABLE II

| Experiment No. | Copolymer (wt % of each monomer) | Separation Time | Beaker Appearance |
|---|---|---|---|
| VI-Control | — | 3 minutes | extremely oily |
| VI-A | 99/01 acrylic acid/stearyl methacrylate | 20 minutes | much better |
| VI-B | 98/02 acrylic acid/stearyl methacrylate | 1 day | same |
| VI-C | 97/03 acrylic acid/stearyl methacrylate | 2 day | better |
| VI-D | 96/04 acrylic acid/stearyl methacrylate | 1 day | much better |
| VI-E | 95.5/4.5 acrylic acid/stearyl methacrylate | 1 day | better |
| VI-F | 97/03 acrylic acid/hexadecyl methacrylate | 1 day | better |
| VI-G | 96/04 acrylic acid/hexadecyl methacrylate | 1 day | same |
| VI-H | 95.5/4.5 acrylic acid/hexadecyl methacrylate | 1 day | same |
| VI-I | 95/1.6/2.9 acrylic acid/hexadecyl methacrylate/octadecyl | 1 day | better |

TABLE II-continued

| Experiment No. | Copolymer (wt % of each monomer) | Separation Time | Beaker Appearance |
|---|---|---|---|
| | methacrylate | | |

Example VII
Salt Water Applications

Acrylic acid/stearyl methacrylate copolymers were prepared in the following manner: 101.5 grams of Mineral Oil (Isopar ®), 0.36 grams of azobisisobutyronitrile initiator, 0.9 grams of Witconate ® P10-59 emulsifier and stearyl methacrylate (SMA) were weighed into eight ounce bottles. Acrylic acid (AA) was then weighed in, and the bottles were agitated to mix and dissolve all chemicals. These bottles were also purged with an inert gas, capped and placed in a 60° C. bottle bath for 16 hours. After polymerization of the monomers, the percent solids in the slurry was determined and the total polymer conversion and yields were calculated. Table I exhibits the specific amounts of each monomer used.

The above experiments (due to the low level of emulsifier employed) illustrate the relative stability of various copolymer emulsifiers and as such do not reflect commercially viable separation times. Stable emulsions with separation times greater than 1 month are obtainable using the emulsifiers in concentration of about 1 wt. percent or greater.

TABLE III

Preparation of Acrylic Acid Copolymers

| Sample Designation | Grams SMA | Grams of AA | Amount of SMA in Polymer (PPHM) | Percent Total Solids | Percent Yield |
|---|---|---|---|---|---|
| E1 | — | 18.0 | None | 13.3 | 84.0 |
| E2 | .18 | 17.8 | 1 | 15.1 | 96.0 |
| E3 | .36 | 17.6 | 2 | 13.6 | 86.0 |
| E4 | .54 | 17.5 | 3 | 13.5 | 85.3 |
| E5 | .72 | 17.3 | 4 | 13.8 | 87.3 |
| E6 | .90 | 17.1 | 5 | 14.2 | 90.0 |
| E7 | 1.26 | 16.7 | 7 | 13.5 | 90.6 |
| E8 | 1.80 | 16.2 | 10 | 14.5 | 92.5 |

Aqueous solution for use in the test emulsions were made directly from the polymer slurries. In order to provide 0.17 grams of polymer in the test emulsions, various amounts of polymer slurry (dependent on the actual polymer content of the bottle) were dissolved in water. Ammonium hydroxide (equa) to the polymer amount and not the slurry amount) was also added to effect solubilization of the polymer. To this mixture, anionic Triton ® X301 and crude oil were added and mixed for 30 seconds at high speed during which time 3 drops of an antifoam agent (Eldefoam ® 2892) were added. This was followed by additional stirring for 14 minutes and 30 seconds at medium speed.

In order to simulate "oil well" or "hard water" conditions (where the polymers of the instant invention have special utility), salt (NaCl) was added to the aqueous polymer solution prior to the addition of the oil to produce emulsions with a 5% NaCl and 15% NaCl content. Specifically, for the 5% NaCl 1.65 grams of NaCl were added. Likewise, for the 15% NaCl emulsions, 5.01 grams were added. The percent NaCl content is based upon the amount of water (33.08 grams) present in each For example, an oil-in-water emulsion incorporating sample E1 and 5% NaCl was prepared using the following recipe:

| | |
|---|---|
| 10.81 grams | of crude oil |
| 4.20 grams | of anionic Triton X301 |
| 1.36 grams | of E1 slurry, polymer content = 12.5% |
| 0.17 grams | of ammonium hydroxide |
| 33.08 grams | of water |
| 1.65 grams | of NaCl |
| 51.27 grams, | total weight |

Each of the emulsions prepared were subject to the following stability tests:

A. Separation Time

The length of time which elapsed before the system separated into two layers. A longer separation time indicates a more stable emulsion.

B. Beaker Appearance

Cleanliness of a polyethylene beaker when rinsed with water (in contrast to beaker appearance where no acrylic acid/acrylate ester emulsifier is used). In this test the better the emulsifier, the cleaner the beaker appearance will be in comparison to the control.

The result of these tests are shown in Tables II and III below:

TABLE IV

Oil-In-Water Stability Test 5% NaCl Content

| Sample Designation | Amount SMA in Polymer | Time to Separate | Beaker Appearance |
|---|---|---|---|
| Control | No Polymer | 10 minutes | Control |
| E1 | None | 10 minutes | Same |
| E2 | 1 PPHM | 150 minutes | Cleaner |
| E3 | 2 PPHM | 40 minutes | Much Cleaner |
| E4 | 3 PPHM | 22 minutes | Much Cleaner |
| E5 | 4 PPHM | 6 minutes | Same |
| E6 | 5 PPHM | 6 minutes | Dirtier |
| E7 | 7 PPHM | 6 minutes | Much Dirtier |
| E8 | 10 PPHM | 6 minutes | Dirtier |

TABLE V

Oil-In-Water Stability Test 15% NaCl Content

| Sample Designation | Amount SMA in Polymer | Time to Separate | Beaker Appearance |
|---|---|---|---|
| Control | No Polymer | 1 minute | Control |
| E1 | None | 3 minutes | Same |
| E2 | 1 PPHM | 10 minutes | Same |
| E3 | 2 PPHM | 3 minutes | Cleaner |
| E4 | 3 PPHM | 3 minutes | Same |
| E5 | 4 PPHM | 6 minutes | Dirtier |
| E6 | 5 PPHM | 3 minutes | Dirtier |
| E7 | 7 PPHM | 3 minutes | Dirtier |
| E8 | 10 PPHM | 3 minutes | Same |

The above data illustrates that interpolymers containing from 97 to 99 wt percent acrylic acid and from 1 to 3 wt. percent of an acrylate ester (Examples E2-4 in Tables IV and V) exhibit enhanced stability and emulsifying properties as opposed to a 100% acrylate acid polymer (Example EI in Tables IV and V) or those acrylic acid polymers with 4 wt percent or greater of the acrylate (Examples E5-E8 in Tables IV and V). Specifically, the claimed 97-99 wt % acrylic acid/1-3 wt % acrylate ester copolymers provide either longer separation times or a better beaker appearance than the polymers outside of this range.

In summary, the emulsions and dispersions of hydrocarbonaceous materials in water of the present invention possess extremely good stability. This stability arises from the polymers, unique structure which consists of a large molecular weight polymer, with both hydrophilic (water-loving) and hydrophobic (water-hating) groups. This structure enables the polymeric material to attach to the hydrocarbonaceous material-water interface and, due to its large molecular weight, remain at the interface position. The use of a combination of a conventional surfactant and a polymer possessing emulsifier and/or stabilizer properties provides an extremely good result in the practice of the present invention. The conventional emulsifier (surfactant) facilitates the formation of emulsions, while the polymeric material (emulsifier/emulsion stabilizer) stabilizes them.

The foregoing description of the preferred embodiments of the present invention has been presented for purposes of illustration and description. It is not intended to be exhaustive or to limit the invention to the precise form disclosed, and obviously many modifications and variations are possible in light of the above disclosure. The embodiments were chosen and described in order to explain best the principle of the invention and its practical applications to thereby enable others skilled in the art to best utilize the invention in its various embodiments and with various modifications as are suited to the particular contemplated. It is intended that the invention be defined by claims appended hereto.

What is claimed:

1. An interpolymer of a monomeric mixture consisting of (1) about 97 to about 99 percent by weight of at least one water soluble polymerizable monomer containing at least one acid group or salts thereof, and (2) about 1 to about 3 percent by weight of at least one acrylic ester monomer of the formula

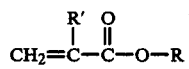

wherein R is selected from the group consisting of alkyl groups having from 10 to 30 carbon atoms and R' is selected from the group consisting of hydrogen and methyl.

2. The interpolymer of claim 1 wherein said water soluble polymerizable monomer containing at least one acid group is selected from the group consisting of acrylic acid, methacrylic acid, maleic anhydride, maleic acid, and combination thereof.

3. The interpolymer of claim 1 wherein the acrylic ester monomer is selected from the group consisting of decyl acrylate, lauryl acrylate, hexadecyl methacrylate, octadecyl acrylate, behenyl acrylate, melissyl acrylate and combinations thereof.

4. A method of producing a stable oil-in-water emulsion comprising mixing (i) water containing about 1 to 20 percent by weight salt, (ii) oil and (iii) a polymer possessing emulsifying and emulsion stabilizing properties, wherein the emulsion comprises the oil in an amount not greater than 80 wt. percent of the emulsion and the polymer in an amount between 0.01 and 5 wt. percent of the emulsion and wherein the polymer comprises (1) about 97 to about 99 percent by weight of an olefinic unsaturated carboxylic monomer, and (2) about 1 to 3 percent by weight of an acrylic acid monomer of the formula:

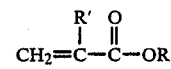

where R is a member of a Class consisting of alkyl groups having from 10 to 30 carbon atoms and R' is selected from the group consisting of hydrogen and methyl.

5. The method of claim 4 wherein said carboxylic acid monomer is selected from the group consisting of acrylic acid, methacrylic acid, maleic anhydride, maleic acid and combinations thereof.

6. The method of claim 4 wherein the acrylic ester monomer is selected from the group consisting of decyl acrylate, lauryl acrylate, hexadecyl methacrylate, octadecyl acrylate, behenyl acrylate, melissyl acrylate and combinations thereof.

7. The method of claim 4 for producing an oil-in-water emulsion comprising mixing together oil, water comprising 1 to 20 wt. percent salt and the polymer possessing emulsifying and emulsion stabilizing properties, wherein the polymer comprises

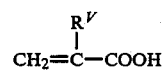

wherein $R^V$ is a substituent selected from the class consisting of hydrogen, chlorine, bromine, hydroxyl and the cyanogen (C≡N) group and monovalent alkyl, aryl, aralkyl, alkaryl and cycloaliphatic hydrocarbon radicals and from about 1 to about 3 percent by weight base upon the total monomers of a monomeric acrylic ester of the formula:

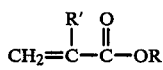

wherein R' is a member of the class consisting of alkyl groups having from 10 to 30 carbon atoms and R' is selected from the group consisting of hydrogen and methyl.

8. The method of claim 7 further comprising mixing a low molecular weight surfactant with said oil, water and polymer.

9. The method of claim 4 further comprising mixing a low molecular weight surfactant with said oil, water, and polymer.

10. A stable oil-in-water emulsion comprising (i) water containing 1 to 20 wt. percent salt, (ii) oil in an amount not greater than 80 wt. percent of the emulsion and (iii) polymer having emulsifying and emulsion stabilizing properties in an amount between 0.01 and 5 wt. percent of the emulsion, wherein the polymer comprises, (I) about 97 to about 99 percent by weight of at least one water soluble polymerizable monomer containing at least one acid group or salts thereof, and (2) about 1 to 3 percent by weight of at least one acrylic acid monomer of the formula:

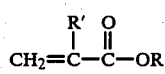

where R is a member of a class consisting of alkyl groups having from 10 to 30 carbon atoms and R' is selected from the group consisting of hydrogen and methyl.

11. The stable oil-in-water emulsion of claim 10 wherein said water soluble polymerizable monomer is selected from the group consisting of acrylic acid, methacrylic acid, maleic anhydride, maleic acid, and combinations thereof.

12. The stable oil-in-water emulsion of claim 10 wherein the acrylic ester monomer is selected from the group consisting of decyl acrylate, lauryl acrylate, hexadecyl methacrylate, octadecyl acrylate, behenyl acrylate, melissyl acrylate and combinations thereof.

13. An oil-in-water emulsion of claim 10 wherein the polymer comprises about 97 to about 99 percent by weight of at least one caroboxylic acid monomer of the formula

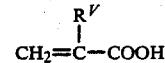

wherein $R^V$ is a substituent selected from the class consisting of hydrogen, chlorine, bromine, hydroxyl and the cyanogen (C≡N) group and monovalent alkyl, aryl, aralkyl, alkaryl and cycloaliphatic hydrocarbon radicals and from about 1 to about 3 percent by weight base upon the total monomers of at least one monomeric acrylic ester of the formula:

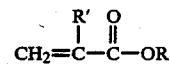

wherein R' is a member of the class consisting of alkyl groups having from 10 to 30 carbon atoms and R' is selected from the group consisting of hydrogen and methyl.

14. The emulsion of claim 13 further comprising a low molecular weight surfactant.

15. The emulsion of claim 10 further comprising a low molecular weight surfactant.

* * * * *

UNITED STATES PATENT AND TRADEMARK OFFICE
CERTIFICATE OF CORRECTION

PATENT NO. : 4,911,736

DATED : March 27, 1990

INVENTOR(S) : Chor Huang, et al

It is certified that error appears in the above-identified patent and that said Letters Patent is hereby corrected as shown below:

Col. 14, Claim 7, line 37, delete "(C=N)" and insert---therefor--- "(C≡N)".

Col. 16, Claim 13, line 9, delete "(C=N)" and insert---therefor--- "(C≡N)".

Signed and Sealed this

Seventh Day of May, 1991

*Attest:*

HARRY F. MANBECK, JR.

*Attesting Officer*  *Commissioner of Patents and Trademarks*